United States Patent
Ramamurthy et al.

(10) Patent No.: US 9,220,118 B1
(45) Date of Patent: Dec. 22, 2015

(54) METHOD AND SYSTEM FOR ESTABLISHING A DEFAULT BEARER IN ACCORDANCE WITH A SUBSTITUTE PACKET DATA POLICY

(71) Applicant: Sprint Spectrum L.P., Overland Park, KS (US)

(72) Inventors: Suryanarayanan Ramamurthy, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 260 days.

(21) Appl. No.: 13/961,272

(22) Filed: Aug. 7, 2013

(51) Int. Cl.
*H04W 76/02* (2009.01)
*H04L 29/06* (2006.01)
*H04L 12/24* (2006.01)
*H04L 29/14* (2006.01)
*H04W 60/04* (2009.01)

(52) U.S. Cl.
CPC .............. *H04W 76/02* (2013.01); *H04L 41/06* (2013.01); *H04L 63/0892* (2013.01); *H04L 69/40* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 2008/0254768 A1 | 10/2008 | Faccin | |
| 2010/0297979 A1* | 11/2010 | Watfa et al. | 455/404.1 |
| 2012/0020345 A1 | 1/2012 | Zhou et al. | |
| 2012/0042058 A1* | 2/2012 | Shaikh et al. | 709/222 |
| 2012/0063300 A1 | 3/2012 | Sahin et al. | |
| 2012/0294236 A1* | 11/2012 | Watfa et al. | 370/328 |
| 2013/0012165 A1* | 1/2013 | Popovich et al. | 455/411 |
| 2014/0024370 A1* | 1/2014 | Sen et al. | 455/435.1 |

OTHER PUBLICATIONS

EventHelix.com Inc., "LTE Attach and Default Bearer Setup Messaging," 2012.*
Alcatel-Lucent, "The LTE Network Architecture: A comprehensive tutorial," Strategic White Paper, 2009.

* cited by examiner

*Primary Examiner* — Chi H Pham
*Assistant Examiner* — Vladislav Agureyev (57) ABSTRACT

A mobility management entity (MME) may receive a request that identifies an access point name (APN) for a packet data connection for a wireless communication device (WCD). The APN may be authorized by the WCD according to a service profile in a home subscriber server (HSS), and the APN may be associated with a subscribed packet data policy. However, if the MME determines that it cannot validate the request (e.g., because the HSS is unreachable or non-responsive), the MME may send to a packet gateway a session request that identifies the WCD and includes a dummy APN. The dummy APN is associated with a substitute packet data policy that differs from the subscribed packet data policy. Based on the session request including the dummy APN, the packet gateway may establish a packet data session for the WCD in accordance with the substitute packet data policy.

19 Claims, 4 Drawing Sheets

METHOD AND SYSTEM FOR ESTABLISHING A DEFAULT BEARER IN ACCORDANCE WITH A SUBSTITUTE PACKET DATA POLICY

BACKGROUND

Wireless networks may provide packet data services to wireless communication devices (WCDs). For example, a wireless network may include one or more packet gateways to one or more packet data networks. A WCD may request a packet data connection and, if the wireless network is able to validate the WCD's request, the wireless network may connect the WCD to one of the packet data networks through one of the packet gateways. The packet data connection may conform to a packet data policy, which may establish quality of service (QoS) parameters and/or other parameters for the packet data connection.

The determination of which packet gateway and which packet data network to use for a WCD's packet data connection may be based on information provided by the WCD. For example, in Long Term Evolution (LTE) protocols, the WCD may transmit a request that includes an access point name (APN). The APN may include a network identifier that identifies a requested packet data network and may also include an operator identifier that may be used to locate a packet gateway to the requested packet data network.

In the LTE approach, a Mobility Management Entity (MME) in the wireless network may receive the APN included in the WCD's request and may query a Home Subscriber Server (HSS) to determine whether the APN is authorized for the WCD, for example, based on a service profile associated with the WCD. If the MME determines that the APN is authorized for the WCD, the MME may then query a domain name server (DNS) to locate a packet gateway based on the APN. Once the MME has located a packet gateway, the MME may provide the APN and an identification of the WCD to the packet gateway. The packet gateway may then obtain from a Policy Charging and Rules Function (PCRF) a packet data policy that is associated with the APN and establish a packet data session for the WCD in accordance with the packet data policy. To establish the packet data session, the packet gateway may assign an Internet Protocol (IP) address to the WCD and establish one or more bearers for transmitting packet data to and receiving packet data from the WCD. The one or more bearers may include a default bearer, which the WCD may use for certain types of packet data services (e.g., non-guaranteed bit rate services). The one or more bearers may also include one or more dedicated bearers, which the WCD may use for other packet data services, such as voice-over-IP (VoIP) communications or other guaranteed bit rate services. Alternatively, the one or more dedicated bearers may be established some time after the default bearer has been established.

OVERVIEW

In one aspect, example embodiments provide a method for a wireless communication system, the wireless communication system comprising a management entity and a packet gateway. The wireless communication system receives a request that identifies a requested network for a packet data connection for a wireless communication device (WCD). The requested network is associated with a subscribed packet data policy. The management entity determines that a validation procedure for validating the request is unavailable. In response to determining that the validation process is unavailable, the management entity sends to the packet gateway a session request that includes an identifier associated with a substitute packet data policy. The substitute packet data policy differs from the subscribed packet data policy. Based on the session request including the identifier associated with the substitute packet data policy, the packet gateway establishes a packet data session for the WCD in accordance with the substitute packet data policy.

In another aspect, example embodiments provide a system comprising a management entity and a packet gateway. The management entity is configured to (i) receive a request that includes an access point name (APN) for a packet data connection for a wireless communication device (WCD), wherein the APN is associated with a subscribed packet data policy, (ii) determine whether a validation procedure for validating the request is available, and (iii) if the validation procedure is unavailable, transmit a session request that includes a dummy APN associated with a substitute packet data policy, wherein the substitute packet data policy differs from the subscribed packet data policy. The packet gateway is provisioned with the substitute packet data policy and is configured to establish a packet data session for the WCD in accordance with the substitute packet data policy in response to receiving the session request that includes the dummy APN.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

1. Introduction

The conventional process of connecting a WCD to a requested packet data network (e.g., a packet data network identified by an APN provided by the WCD) typically relies on successful communications between multiple network entities. If the communications are unsuccessful, the WCD might not be connected to the requested packet data network. In some cases, the communications might not be successful because of a network problem that makes a network entity unreachable or because a network entity is off-line or not functioning properly. As one example, if the HSS associated with the WCD is unreachable or non-responsive, the MME might not be able to determine that the requested packet data network is authorized for the WCD. As another example, the MME may be unable to locate a packet gateway for the requested packet data network because the DNS is unreachable or non-responsive. If either the HSS or DNS is unreachable or non-responsive, the MME may be unable to validate the WCD's request. The result of the MME's inability to validate the WCD's request is that the WCD might not be connected to the requested packet data network—even though the requested packet data network is, in fact, authorized for the WCD. Thus, the WCD might not be able to obtain a packet data connection and may be unable to engage in packet data communications.

To address such difficulties, the inventors propose a substitute procedure that can be used to connect a WCD to a packet data network, so that the WCD can engage in packet data communications, when the MME is unable to validate the WCD's request for connection to a requested packet data network. The substitute procedure can involve the MME selecting a substitute packet gateway for the WCD and instructing the substitute packet gateway to establish a packet data session for the WCD in accordance with a substitute packet data policy. In response to the instruction from the MME, the substitute packet gateway may assign an IP address to the WCD and establish a default bearer for the WCD. The WCD may then use the default bearer for packet data communications.

The substitute packet gateway could be a packet gateway associated with the requested packet data network (e.g., the substitute packet gateway could be the packet gateway that would have been used if the WCD had been connected to the requested packet gateway). Alternatively, the substitute packet gateway could be a packet gateway that is predefined for use with the substitute procedure. The substitute packet data policy could provide QoS parameters and/or other parameters for the default bearer. The substitute packet data policy could be different than the packet data policy that would have been applied if the WCD had been connected to the requested packet data network. For example, the substitute packet data policy may provide a lower QoS level, lower maximum bit rate, etc. In addition, the substitute packet data policy may limit the WCD to only one bearer (the default bearer) and may not allow for any dedicated bearers to be established for the WCD.

To instruct the substitute packet gateway to use the substitute packet data policy, the MME may send the substitute packet gateway a session request that identifies the WCD and includes an identifier associated with the substitute packet data policy. The identifier could be, for example, a dummy APN. Based on the presence of the dummy APN or other identifier in the session request, the substitute packet gateway may retrieve the substitute packet data policy and establish a packet data session for the WCD in accordance with the substitute packet data policy. In some examples, the substitute packet gateway may already be provisioned with the substitute packet data policy, in which case the substitute packet gateway may retrieve the substitute packet data policy from its own data storage. Alternatively, the substitute packet gateway may obtain the substitute packet data policy from some other source, such as be querying a PCRF.

Once the packet data session has been established for the WCD using the substitute packet data policy, the MME may monitor the status of the HSS and/or DNS to determine whether the validation procedure remains unavailable. While the validation procedure remains unavailable, the MME may periodically send keep-alive messages to the substitute packet gateway. Each keep-alive message may cause the substitute packet gateway to maintain the packet data session for the WCD for a preset period of time (e.g., 5 to 60 minutes). If the MME determines that the validation procedure has become available, the MME may stop sending keep-alive messages to the substitute packet gateway. As a result, the substitute packet gateway may release the WCD's packet data session once the preset period of time expires. Alternatively or additionally, if the MME determines that the validation procedure has become available, the MME may cause the WCD to send a new request for a packet data connection to the requested network. If the MME determines that the WCD's new request is successful (e.g., the WCD successfully connects to the requested packet data network), the MME may instruct the substitute packet gateway to release the packet data session that it had established for the WCD.

In this way, a packet data session can be established for a WCD when network problems or problems with a network entity such as an HSS or DNS prevent the WCD's request for connection to a requested packet data network from being validated.

2. Example Wireless Communication System

Figure 1:
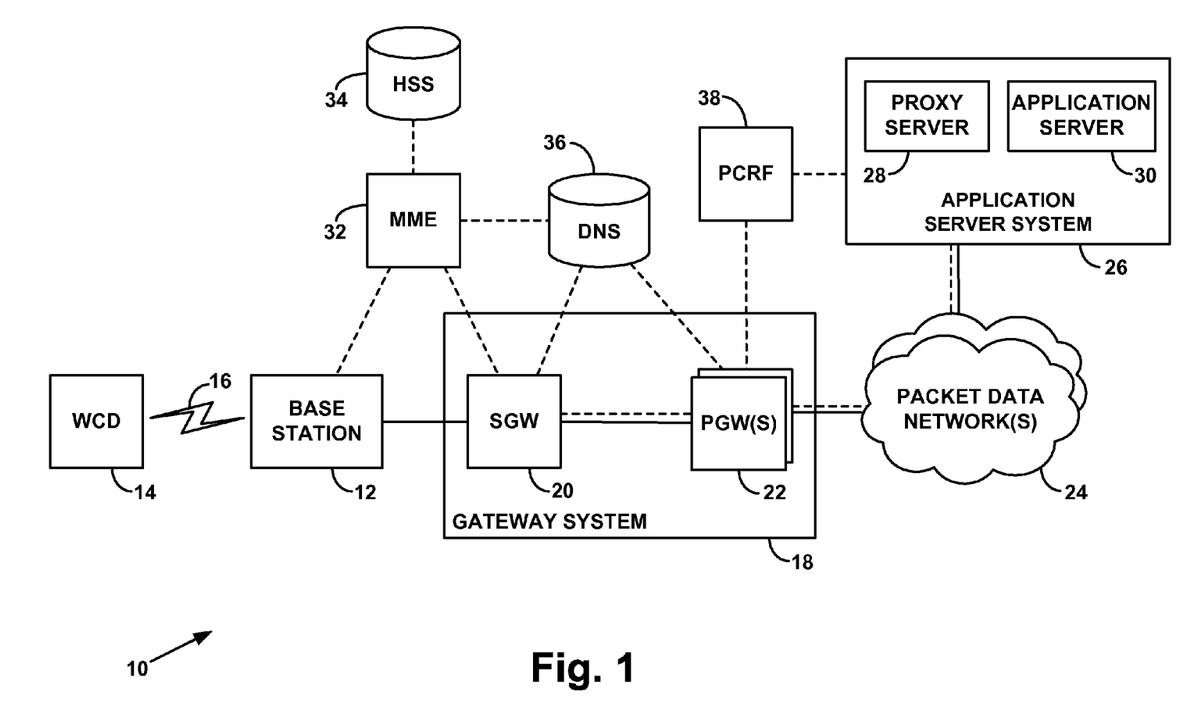
FIG. 1 is a block diagram of a wireless communication system, in accordance with an example embodiment.

FIG. 1 illustrates an example wireless communication system 10 in which aspects of the present disclosure can be implemented. In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. It is to be understood, that the arrangement of wireless communication system 10 shown in FIG. 1, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

The example wireless communication system 10 includes a representative base station (e.g., eNodeB) 12 and a WCD 14 within the wireless coverage of the base station 12. The base station 12 and WCD 14 may be configured to communicate with each other over a radio frequency air interface 16 according to any of a variety of air interface protocols, examples of which include Orthogonal Frequency Division Multiple Access (OFDMA) (e.g., LTE or Wireless Interoperability for Microwave Access (WiMAX)), Code Division Multiple Access (CDMA), Global System for Mobile Communications (GSM), and others now known or later developed.

The example wireless communication system 10 further includes a gateway system 18 comprising a serving gateway (SGW) 20 and one or more packet gateways (PGWs) 22. The SGW 20 is configured to communicate with the base station 12 and with the PGWs 22. The PGWs 22 are configured to provide connectivity with one or more packet data networks 24. For instance, each particular PGW in the PGWs 22 may be configured to provide connectivity a particular packet data network in the packet data networks 24.

Shown in FIG. 1 is an example application server system 26 that may control packet data services through at least one of the packet data networks 24. In this example, application server system comprises a proxy server 28 and an application server 30, which may support various application services for WCDs. By way of example, the application server 30 may be an Internet Multimedia Subsystem (IMS) server configured to provide VoIP services, and the proxy server 28 may be an IMS Call Session Control Function (CSCF).

The example wireless communication system 10 also includes a MME 32, which functions as a controller and may be configured to carry out various functions described herein. The MME 32 is configured to communicate with the base station 12 and with the SGW 20. In addition, the MME 32 is configured to communicate with a Home Subscriber Server (HSS) 34 and a domain name server (DNS) 36. HSS 34 may store service profiles for various WCDs, such as WCD 14. DNS 36 may be configured to resolve names (e.g., domain names, APNs, etc.) to IP addresses.

Also included in example wireless communication system 10 is a Policy Charging and Rules Function (PCRF) 38. The PGWs 22 and application server system 26 may be configured to query PCRF 38 to obtain policies for packet data sessions that may be established for WCDs, such as WCD 14.

With the example wireless communication system 10 shown in FIG. 1, WCD 14 may obtain a packet data connection by transmitting messages to base station 12 over the air interface 16. One of the messages may include an APN that identifies one of the packet data networks 24 as a requested packet data network for a packet data connection for the WCD 14. The MME 32 may receive the APN from base station 12, and the MME 32 may determine that the requested packet data network is authorized for the WCD 14 by querying the HSS 34. The MME 32 may then query the DNS 36 to identify a packet gateway based on the APN. For example, the DNS 36 may identify a particular packet gateway in the PGWs 22 by its IP address. The MME 32 may then communicate with the identified packet gateway via the SGW 20. For example, the MME 32 may send a session request that identifies the WCD 14 and includes the APN. The packet gateway may query PCRF 38 to obtain a packet data policy based on the APN. The packet gateway may then assign an IP address to the WCD 14 and create a default bearer for the WCD 14 in accordance with the packet data policy.

However, if the MME 32 is unable to communicate with either the HSS 34 or the DNS 36, the MME may select a substitute packet gateway in the PGWs 22 and send to the substitute packet gateway (via SGW 20) a session request that identifies the WCD 14 and includes a dummy APN. Based on the dummy APN, the substitute packet gateway may retrieve a substitute packet data policy. In some examples, the substitute packet gateway may be provisioned with the substitute packet data policy such that it does not query the PCRF 38. The substitute packet gateway may then assign an IP address to the WCD 14 and create a default bearer for the WCD 14 in accordance with the substitute packet data policy.

3. Example Methods

Figure 2:
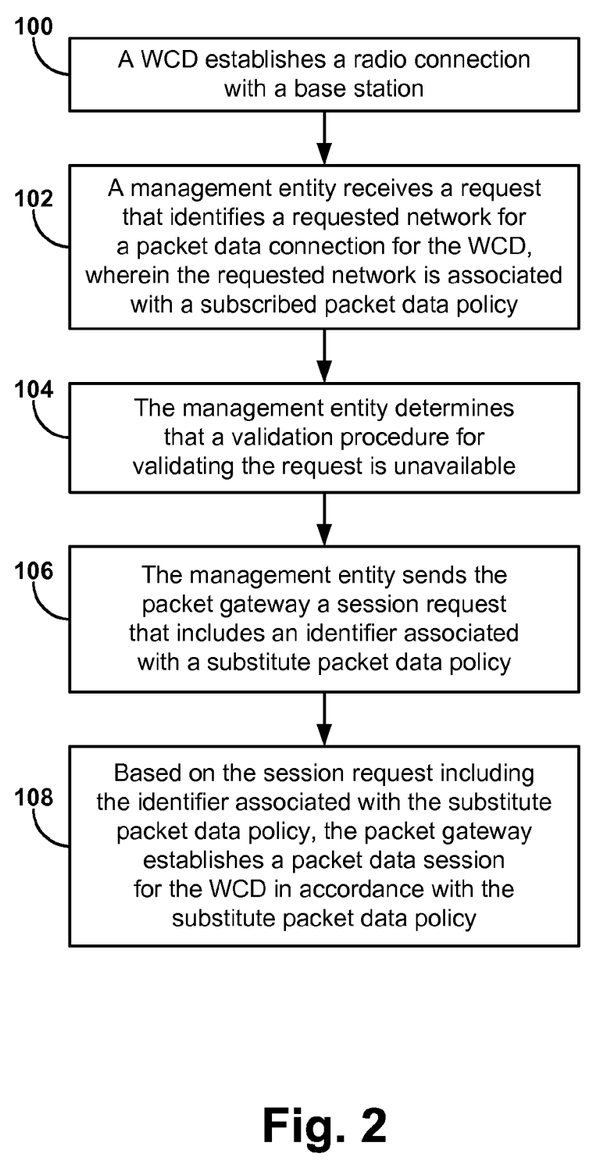
FIG. 2 is a flow chart illustrating a method, in accordance with an example embodiment.

FIG. 2 is a flow chart illustrating an example method for establishing a packet data session for a WCD (e.g., WCD 14). The method could be carried out by various entities within wireless communication session 10 shown in FIG. 1, such as the MME 32 and a packet gateway in PGWs 22. It is to be understood, however, that the method could be performed using additional and/or other entities from that shown in FIG. 1. For purposes of illustration, the method of FIG. 2 will be described in relation to protocols used in LTE networks. It is to be understood, however, that other protocols could be used.

The method of FIG. 2 begins when a WCD (e.g., WCD 14) establishes a radio connection with a base station (e.g., base station 12), as indicated by block 100. The WCD may establish this radio connection because the WCD has moved into the wireless coverage area of the base station, because the WCD has powered up within the wireless coverage area of the base station, because the WCD has become active after being dormant for a period of time, or for some other reason. To establish the radio connection, the WCD may transmit messages to and receive messages from the base station, for example, in accordance with a Radio Resource Control (RRC) protocol.

Once the WCD has established the radio connection with the base station, the WCD may transmit messages to a management entity (e.g., MME 32) and receive messages from the management entity, for example, in accordance with Non-Access Stratum (NAS) protocols. In some implementations, the WCD may initially transmit an attach request and a packet data network (PDN) connectivity request. The PDN connectivity request may include a WCD-requested APN that identifies a requested network for the packet data connection being requested by the WCD. The PDN connectivity request may also include a requested QoS level for the packet data connection. In other implementations, the WCD may identify the requested network and/or the requested QoS level in a subsequent message, such an ESM Information Response.

Thus, at some point, the management entity receives a request that identifies a requested network for a packet data connection for the WCD, as indicated by block 102. The management entity may receive the request from a base station in response to the base station receiving a message from the WCD (e.g., a PDN connectivity request or ESM Information Response). The request may include a WCD-requested APN that identifies the requested network. However, other ways of identifying the requested network are possible as well. The request may also include a requested QoS level for the packet data connection.

For purposes of illustration, it is assumed that the WCD is authorized to use the requested network. For example, an HSS associated with the WCD (e.g., HSS 34) may store a service profile for the WCD, in which the service profile identifies the WCD-requested APN as being authorized for the WCD. Thus, the requested network may be a network to which a subscriber associated with the WCD has subscribed. Further, the requested network may be associated with a subscribed packet data policy, such that the subscribed packet data policy may also be identified by the WCD-requested APN. For example, the subscribed packet data policy may be stored in a PCRF (e.g., PCRF 38) in association with the WCD-requested APN. With the PCRF provisioned in this way, a packet gateway may receive the WCD-requested APN in a session request, use the WCD-requested APN to query the PCRF, receive the subscribed packet data policy from the PCRF in response to the query, and establish a packet data session in accordance with the subscribed packet data policy.

In the example of FIG. 2, however, the management entity determines that a validation procedure for validating the request (i.e., to validate the requested network for the WCD) is unavailable, as indicated by block 104. The validation procedure may be unavailable because the HSS associated with the WCD (e.g., HSS 34) is unreachable or non-responsive, because a DNS (e.g., DNS 36) is unreachable or non-responsive, or because of some other type problem within the network or with a particular network entity.

The management entity may determine that the validation procedure is unavailable in various ways. In some implementations, the management entity may receive status information regarding the status of various network entities. For example, if the status information indicates that the HSS or DNS is off-line or has failed, then the management entity may determine that the validation procedure is unavailable.

In other implementations, the management entity may determine that the validation procedure is unavailable when the HSS or DNS fails to respond to one or more queries from the management entity. For example, to determine whether the WCD is authorized to use the requested network, the management entity may transmit to the HSS a query that includes an identification of the WCD and an identification of the requested network (e.g., the WCD-requested APN). The management entity may then wait for up to a predetermined period of time (e.g., 1-5 seconds) after transmitting the query to receive a response from the HSS. If the management entity does not receive a response within that predetermined period of time, the management entity may re-transmit the query to the HSS and again wait to receive a response within the predetermined period of time. If, after a predetermined number of tries (e.g., three tries), the management entity does not receive a response to its query, the management entity may determine that the HSS is unreachable or non-responsive and, thus, determine that the validation procedure is unavailable. The management entity may determine whether the DNS is unreachable or non-responsive in a similar manner.

In response to determining that the validation procedure is unavailable, the management entity sends a packet gateway a session request that includes an identifier associated with a substitute packet data policy, as indicated by block 106. The session request may also identify the WCD and include other information.

The packet gateway could be selected by the management entity based on the validation procedure being unavailable. For example, the packet gateway could be a predefined packet gateway that the management entity selects whenever a WCD's request to use a particular network cannot be validated. Alternatively, the packet gateway could be a packet gateway that is associated with the requested network. For example, the management entity may query a DNS to locate a packet gateway based on an APN that identifies the requested network and send that packet gateway the session request, albeit with an instruction to use the substitute packet data policy instead of the subscribed packet data policy that is associated with the requested network. The management entity's selection of the packet gateway could also take into consideration other factors, such as load balancing. Other ways of selecting the packet gateway are possible as well.

The substitute packet data policy may differ from the subscribed packet data policy. For example, the substitute packet data policy may be associated with a lower QoS level and/or a lower maximum bit rate. Further, whereas the subscribed packet data policy may include one or more parameters related to charging a subscriber for packet data services provided under the policy, the substitute packet data policy may specify that packet data services provided under the policy are not chargeable to the subscriber. In addition, whereas the subscribed packet data policy may specify that the packet gateway is to query a PCRF, the substitute packet data policy may specify that the packet gateway should not query the PCRF (i.e., the substitute packet data policy could be a static policy). Other differences are possible as well.

The identifier associated with the substitute packet data policy could be any identifier that the packet gateway can use to determine the substitute packet data policy. For example, the identifier that is included in the session request could be a dummy APN, i.e., an identifier that is in the form of an APN but does not identify an actual packet data network to which subscribers may subscribe. Thus, while the WCD's service profile stored in the HSS may include the WCD-requested APN, to indicate that the WCD is authorized to use that APN, the WCD's service profile might not include the dummy APN.

In some examples, the session request from the management entity may also specify a QoS level, such as a QoS level associated with the substitute packet data policy. The QoS level that is specified in the session request could be different than a QoS level requested by the WCD. For example, the management entity may specify a QoS level in the session request that is lower than the QoS level requested by the WCD. The QoS level could be specified as a QoS Class Identifier (QCI). In this regard, LTE defines QCIs 1 through 9, of which QCIs 1 through 4 are for guaranteed bit rate bearers and QCIs 5 through 9 are for non-guaranteed bit services. QCI=9 has the lowest priority. The QoS level that is associated with the substitute packet data policy and/or specified by the management entity in the session request could be, for example, the lowest priority QoS level (QCI=9). Alternatively, a somewhat higher priority QoS level, such as QCI=8, could be used. It is to be understood, however, that specifying QoS levels in terms of QCIs is only one possibility, as QoS levels could be specified in other ways.

Based on the session request including the identifier associated with the substitute packet data policy, the packet gateway establishes a packet data session for the WCD in accordance with the substitute packet data policy, as indicated by block 108. The packet gateway may obtain the substitute packet data policy based on the identifier (e.g., the dummy APN) in various ways. In some examples, the packet gateway may already be provisioned with the substitute packet data policy, in which case the packet gateway may retrieve the substitute packet data policy from its own data storage. In other examples, the packet gateway may obtain the substitute packet data policy from some other source, such as by querying a PCRF.

Establishing the packet data session for the WCD can involve assigning an IP address to the WCD and establishing a default bearer for the WCD. The IP address that is assigned to the WCD could be, for example, an IPv4 or IPv6 address. In addition, the IP address could be assigned from a pool of IP addresses that is associated with the substitute packet data policy. Thus, the packet gateway may have only a limited number of IP addresses that are available for use under the substitute packet data policy.

The packet gateway may establish the default bearer for the WCD using various parameters specified by the substitute packet data policy. An example set of parameters is given below:
BEARER=DEFAULT
POLICY=STATIC
PCRF=OFF
DSCP Marking=CS1 for QCI=9
DSCP=BE
Maximum Bit Rate for Uplink=100000 KBPS
Maximum Bit Rate for Downlink=100000 KBPS
ARP=12
CHRG=NONE The "BEARER=DEFAULT" parameter indicates that this set of parameters is for a default bearer. The "POLICY=STATIC" and "PCRF=OFF" parameters that these parameters are static throughout the lifetime of the default bearer and that the packet gateway can establish and maintain the default dearer without querying a PCRF.

The DSCP parameters relate to marking packets to indicate their precedence level in accordance with differentiated services (DiffServ) standards. The "DSCP Marking=CS1 for QCI=9" parameter indicates that the default bearer has a QoS level of QCI=9 and that the packets transmitted through the default bearer should be marked with a Differentiated Services Code Point (DSCP) value of CS1. The "DSCP=BE" parameter indicates that the packets marked with the DSCP value of CS1 are to be given a "best effort" (BE) precedence, which is typically the lowest level of precedence.

The "Maximum Bit Rate" parameters specify the maximum bit rates that the WCD can use on the uplink and downlink.

The "ARP=12" parameter indicates specifies a particular Allocation Retention Priority (ARP) of the bearer that allows the bearer to be preempted by higher priority bearers.

The "CHRG=NONE" parameter indicates that the subscriber is not to be charged for the packet data services provided using this default bearer.

It is to be understood that the above parameters are merely illustrative examples, as a substitute packet data policy could have different parameters. Further, the subscribed packet data policy may have different parameters than the substitute packet data policy. For example, the subscribed packet data policy could have a higher maximum bit rate, a DSCP value that indicates a higher level of precedence, a higher QoS level, a higher-priority ARP value, etc.

In this way, the packet gateway may establish a packet data session for the WCD that provides a minimum level of packet data functionality. Put another way, the substitute packet data policy may provide generally less favorable parameters than the subscribed packet data policy that would have been applied if the WCD had been connected to the requested network.

In addition, the packet data session that the packet gateway session establishes for the WCD in accordance with the substitute packet data policy may be temporary. For example, the packet gateway may be configured to release the packet data session (e.g., by tearing down the WCD's default bearer and de-allocating the IP address assigned to the WCD) after a predetermined period of time unless the packet data session is renewed. The packet gateway may be configured to renew the packet data session upon receipt of a keep-alive signal, for example, from the management entity. After receiving a keep-alive signal, the packet gateway may again maintain the packet data session for only the predetermined period of time. Once the predetermined period of time after receiving the keep-alive signal has elapsed, the packet gateway may release the packet data session unless the packet gateway receives another keep-alive signal. The predetermined period of time could be, for example, 5 to 60 minutes.

Figure 3:
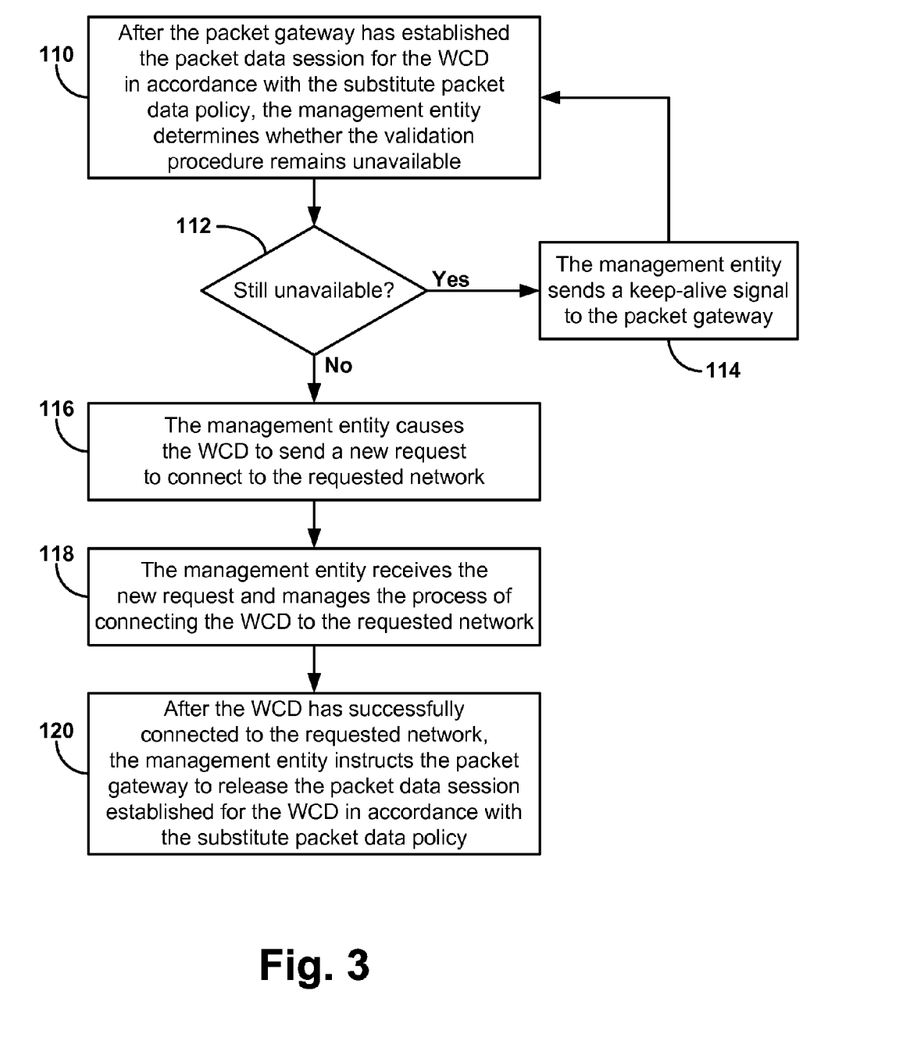
FIG. 3 is a flow chart illustrating a continuation of the method of FIG. 2, in accordance with an example embodiment.

The management entity may send keep-alive signals to the packet gateway, for example, based on the status of one or more network entities (e.g., whether the network entities used in the validation procedure are functioning properly) and/or based on the status of the WCD (e.g., whether the WCD is able to successfully connect to the requested network). FIG. 3 illustrates one example of how the management entity may determine whether to send keep-alive signals to the packet gateway.

As indicated by block 110, after the packet gateway has established the packet data session for the WCD in accordance with the substitute packet data policy (e.g., as indicated by block 108 in FIG. 2), the management entity determines whether the validation procedure remains unavailable. The management entity could make this determination in various ways. For example, if the unavailability of the validation procedure was caused by a problem with the HSS, the management entity may monitor the status of the HSS. If the management entity receives a status update indicating that the HSS is again functioning properly or the management entity finds that the HSS is again responding to its queries, the management entity may determine that the validation procedure is again available. Otherwise, the management entity may determine that the validation procedure remains unavailable. The management entity may monitor the status of the DNS in a similar manner.

Whether the management entity sends a keep-alive signal to the packet gateway may depend on whether the management entity determines that the validation procedure is still unavailable, as indicated by block 112. If the validation procedure is still unavailable, the management entity may send a keep-alive signal to the packet gateway, as indicated by block 114, and the management entity may continue checking the status of the validation procedure (block 110). In response to the keep-alive signal, the packet gateway may maintain the packet data session for the WCD for another predetermined period of time.

If the management entity determines that the validation procedure is now available, the management entity may cause the WCD to send a new request to connect to the requested network, as indicated by block 116. For example, the management entity may send an instruction to the WCD to send another PDN connectivity request with the WCD-requested APN.

The management entity may receive the new request and, in response, manage the process of connecting the WCD to the requested network, as indicated by block 118. For example, the management entity may validate the new request by communicating with the HSS to determine that the WCD is authorized to use the requested network and by communicating with the DNS to receive an identification of a packet gateway to use for the requested network. The management entity may then send a session request to the packet gateway identified by the DNS. In response to the session request, the packet gateway may establish a packet data session for the WCD in accordance with the subscribed packet data policy associated with the requested network.

After the WCD has successfully connected to the requested network, the management entity may instruct the packet gateway to release the packet data session that the packet gateway established for the WCD in accordance with the substitute packet data policy, as indicated by block 120.

4. Example Network Entity

Figure 4:
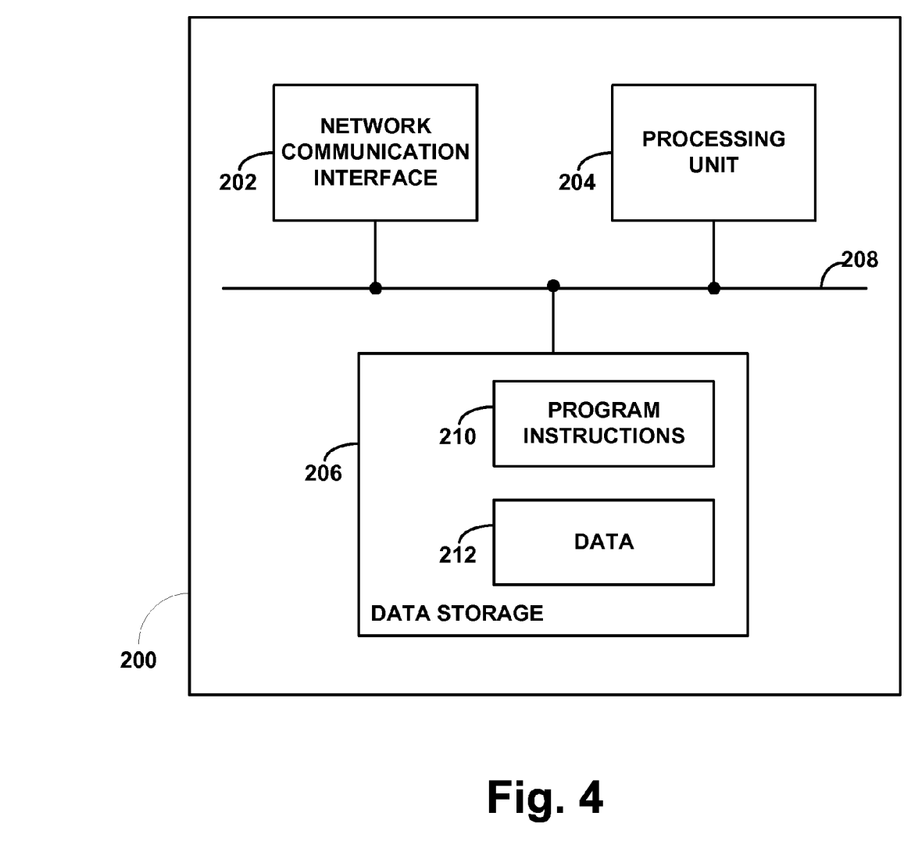
FIG. 4 is a block diagram of a network entity, in accordance with an example embodiment.

FIG. 4 is a block diagram of an example network entity 200. Network entity 200 could be management entity (e.g., MME 32), a packet gateway (e.g., one of PGWs 22), or some other type of network entity. As shown, the network entity 200 includes a network communication interface 202, a processing unit 204, and data storage 206, all of which may be communicatively linked together by a system bus, network, or other connection mechanism 208.

Network communication interface 202 functions to facilitate communication with various other network entities, such as any of the network entities shown in FIG. 1. As such, the interface 202 may include one or more network interface modules, such as Ethernet network interface modules, or any other type of wired and/or wireless communication interfaces Processing unit 204 may comprise one or more general purpose processors (e.g., microprocessors) and/or one or more special purpose processors (e.g., application specific integrated circuits). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein. Data 212 could be any data that is generated, received, or used in connection with carrying out such functions.

In the case that network entity 200 is a management entity, program instructions 210 may be executable by processing unit 204 to carry out any of the management entity functions described herein. By way of example, such functions may include: (i) receiving a request that includes an APN for a packet data connection for a WCD, wherein the APN is associated with a subscribed packet data policy, (ii) determining whether a validation procedure for validating the request is available, and (iii) if the validation procedure is unavailable, transmitting a session request that includes a dummy APN associated with a substitute packet data policy, wherein the substitute packet data policy differs from the subscribed packet data policy. In connection with these functions, data 212 may include the dummy APN.

In the case that network entity is a packet gateway, program instructions 210 may be executable by processing unit 204 to carry out any of the packet gateway functions described herein. By way of example, such functions may include: (i) receiving a session request that identifies a WCD and includes a dummy APN, (ii) obtaining a substitute packet data policy associated with the dummy APN, and (iii) establishing a packet data session for the WCD in accordance with the substitute packet data policy. In connection with these functions, data 212 may include the dummy APN and the parameters of the substitute packet data policy.

5. Conclusion

Exemplary embodiments have been described above. Those skilled in the art will understand, however, that changes and modifications may be made to these embodiments without departing from the true scope and spirit of the invention.

What is claimed is:

1. A method, comprising:
receiving, in a wireless communication system, a request that identifies a requested network for a packet data connection for a wireless communication device (WCD), wherein the requested network is associated with a subscribed packet data policy, and wherein the wireless communication system comprises a management entity and a packet gateway;
determining, by the management entity, that a validation procedure for validating the request is unavailable;
responsive to determining that the validation procedure is unavailable, the management entity sending to the packet gateway a session request that includes an identifier associated with a substitute packet data policy, wherein the substitute packet data policy differs from the subscribed packet data policy;
establishing, by the packet gateway, a packet data session for the WCD in accordance with the substitute packet data policy, based on the session request including the identifier associated with the substitute packet data policy; and
after the packet data session has been established, determining, by the management entity, whether the validation procedure remains unavailable.

2. The method of claim 1, wherein the request includes an access point name (APN) that identifies the requested network, and wherein a service profile associated with the WCD identifies the APN as being authorized for the WCD.

3. The method of claim 2, wherein the identifier associated with the substitute packet data policy is a dummy APN that is not identified in the service profile.

4. The method of claim 3, wherein the packet gateway is provisioned with the substitute packet data policy associated with the dummy APN.

5. The method of claim 1, wherein establishing, by the packet gateway, a packet data session for the WCD in accordance with the substitute packet data policy comprises:
assigning, by the packet gateway, an Internet Protocol (IP) address to the WCD from a pool of IP addresses associated with the substitute packet data policy.

6. The method of claim 1, wherein establishing, by the packet gateway, a packet data session for the WCD in accordance with the substitute packet data policy comprises:
establishing, by the packet gateway, a default bearer for the WCD, wherein the default bearer has a quality of service (QoS) level associated with the substitute packet data policy.

7. The method of claim 6, wherein the request identifies a requested QoS level that is higher than the QoS level associated with the substitute packet data policy.

8. The method of claim 7, wherein the session request identifies the QoS level associated with the substitute packet data policy.

9. The method of claim 1, wherein the WCD is associated with a home subscriber server (HSS) that stores a service profile of the WCD, wherein the service profile indicates that the WCD is authorized to use the requested network.

10. The method of claim 9, wherein the service profile does not include the identifier associated with the substitute packet data policy.

11. The method of claim 9, wherein determining, by the management entity, that the validation procedure is unavailable comprises:
determining, by the management entity, that the HSS is unreachable or non-responsive.

12. The method of claim 10, wherein determining, by the management entity, that the HSS is unreachable or non-responsive comprises:
transmitting, by the management entity, a query to the HSS;
determining, by the management entity, that the management entity did not receive a response from the HSS within a predetermined period of time after transmitting the query;
re-transmitting, by the management entity, the query to the HSS one or more times; and
determining, by the management entity, that the management entity did not receive a response from the HSS after re-transmitting the query one or more times.

13. The method of claim 1, wherein the wireless communication system comprises a policy charging and rules function (PCRF), wherein the substitute packet data policy indicates that the packet gateway should not query the PCRF regarding the packet data session.

14. The method of claim 13, wherein the substitute packet data policy indicates that the packet data session is not chargeable to a subscriber.

15. The method of claim 1, wherein the subscribed packet data policy specifies a subscribed-policy maximum bit rate and the substitute packet data policy specifies a substitute-policy maximum bit rate, wherein the substitute-policy maximum bit rate is lower than the subscribed-policy maximum bit rate.

16. The method of claim 1, further comprising:
determining, by the management entity, that the validation procedure remains unavailable; and
responsive to determining that the validation procedure remains unavailable, the management entity sending a keep-alive signal to the packet gateway, wherein the packet gateway is configured to maintain the packet data session for a predetermined period of time after receiving the keep-alive signal.

17. The method of claim 1, further comprising:
determining, by the management entity, that the validation procedure has become available;
responsive to determining that the validation procedure has become available, the management entity causing the WCD to send a new connection request to connect to the requested network; and
after the WCD has successfully connected to the requested network, the management entity instructing the packet gateway to release the packet data session that the packet gateway established for the WCD in accordance with the substitute packet data policy.

18. A system, comprising:
a management entity, wherein the management entity is configured to (i) receive a request that includes an access point name (APN) for a packet data connection for a wireless communication device (WCD), wherein the APN is associated with a subscribed packet data policy, (ii) determine whether a validation procedure for validating the request is available, and (iii) if the validation procedure is unavailable, transmit a session request that includes a dummy APN associated with a substitute packet data policy, wherein the substitute packet data policy differs from the subscribed packet data policy; and
a packet gateway, wherein the packet gateway is provisioned with the substitute packet data policy and is configured to establish a packet data session for the WCD in accordance with the substitute packet data policy in response to receiving the session request that includes the dummy APN,
wherein the management entity is further configured to determine whether the validation procedure remains unavailable after the packet data session has been established.

19. The system of claim 18, wherein the management entity is configured to determine whether the validation procedure is available by a process comprising:
determining whether a home subscriber server (HSS) responds to one or more queries.

* * * * *